United States Patent [19]

Reidinger

[11] Patent Number: 4,743,090
[45] Date of Patent: May 10, 1988

[54] SCREEN ASSEMBLY FOR ELECTROMAGNETIC RADIATION

[75] Inventor: Michael J. Reidinger, Erie, Pa.

[73] Assignee: Tru-Lyte Systems, Incorporated, Erie, Pa.

[21] Appl. No.: 70,428

[22] Filed: Jul. 7, 1987

Related U.S. Application Data

[63] Continuation of Ser. No. 612,041, May 18, 1984.

[51] Int. Cl.⁴ .............................................. G02B 6/18
[52] U.S. Cl. ................................................. 350/96.27
[58] Field of Search ............... 350/96.24, 96.25, 96.26, 350/96.27

[56] References Cited

U.S. PATENT DOCUMENTS

| | | | |
|---|---|---|---|
| 2,825,260 | 3/1958 | O'Brien | 350/96.25 |
| 4,090,104 | 5/1978 | Vann et al. | 350/96.27 |
| 4,139,261 | 2/1979 | Hilsum | 350/96.27 |
| 4,591,232 | 5/1986 | Jeskey | 350/96.27 |

FOREIGN PATENT DOCUMENTS 1284122 11/1968 Fed. Rep. of Germany ... 350/96.27

OTHER PUBLICATIONS

*RCA Technical Notes,* "Protective Coating for Fiber Optics Face Plate", Kaseman et al., RCATN519, 3/1962.

*Primary Examiner*—William L. Sikes
*Assistant Examiner*—Frank Gonzáles
*Attorney, Agent, or Firm*—Louis E. Marn

[57] ABSTRACT

There is disclosed a novel novel screen assembly comprised of a plurality of optical fiber longitudinally disposed generally in a frame member and having polished surfaces. In one embodiment of the present invention one polished surface is provided with a reflective layer for front projection viewing of an image.

12 Claims, 1 Drawing Sheet

SCREEN ASSEMBLY FOR ELECTROMAGNETIC RADIATION

This is a continuation of application Ser. No. 612,041, filed May 18, 1984.

FIELD OF THE INVENTION

This invention relates to a screen assembly, and more particularly to a novel screen assembly for viewing electromagnetic radiation in the actinic spectrum and method of manufacturing same. This application is a continuation-in-part of U.S. application, Ser. No. 538,797, filed Oct. 4, 1983.

BACKGROUND OF THE INVENTION

Screen assemblies for viewing light images, such as motion pictures, slides and the like, are generally comprised of a cloth or fabric substrate on which is deposited reflective and/or phosphorouscent materials. Such screen assemblies suffer from increasing power resolution of the reflected image due to increasing deposit of foreign nodical including cigarette tars, dirt and the like. Such foreign material are not readily removed from the sulstrate, and thus the screen assembly must be replaced from time to time. Additionally, usual motion picture screen assemblies are front viewing with project light interfering with reflected light.

OBJECT OF THE INVENTION

An object of the present invention is to provide a novel screen assembly.

Another object of the present invention is to provide a novel screen assembly for rearview projection.

Still another object of the present invention is to provide a novel screen assembly of improved light reflection.

Yet another object of the present invention is to provide a novel screen assembly readily cleaned of foreign material.

SUMMARY OF THE INVENTION

These and other objects of the present invention are achieved by a novel screen assembly comprised of a plurality of optical fiber longitudinally disposed in a frame member and having polished surfaces. In one embodiment of the present invention, one polished surface is provided with a reflective layer for front viewing of a projected image.

BRIEF DESCRIPTION OF THE DRAWINGS

A better understanding of the present invention as well as additional objects and advantages thereof will become apparent, upon consideration of the detailed disclosure thereof, especially when taken with the accompanying drawings; wherein.

DETAILED DESCRIPTION OF THE DRAWINGS

Figure 1:
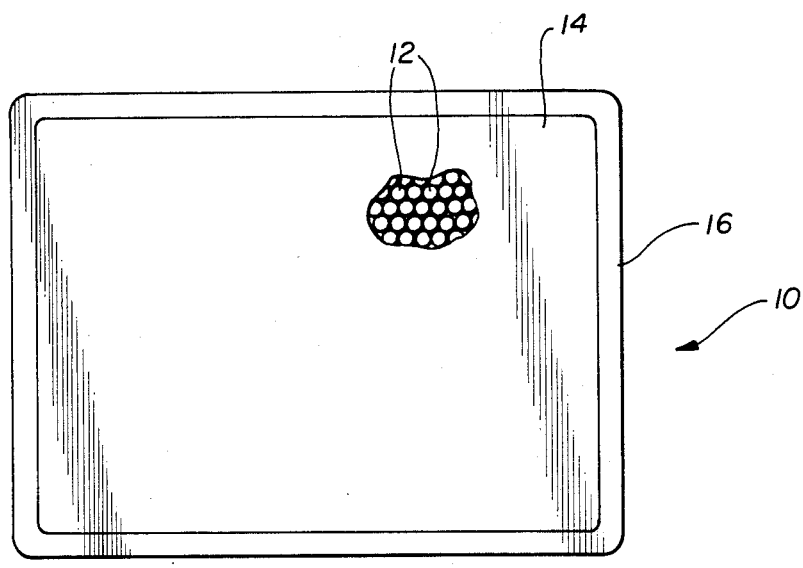
FIG. 1 is an elevational view of the novel screen assembly of the present invention.
Figure 2:
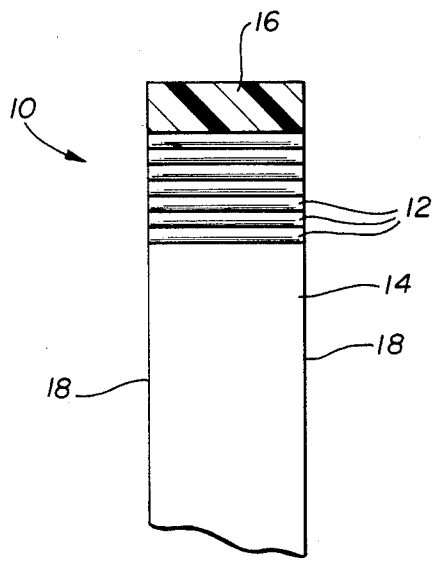
FIG. 2 is an enlarged cross-sectional view of the screen assembly of FIG. 1.

Referring now to the drawings, and in particular FIGS. 1 and 2, there is illustrated a novel screen assembly, generally indicated as 10, comprised of a plurality of optical fibers 12 longitudinally or lengthwise disposed to each other forming a screen member 14 disposed in a frame member 14. The optical fibers 12 may be bonded to each other or may be held together by the frame member 16, i.e. the frame member 12, per se, should not be an integral part of the assembly 10. The frame member 14 of the screen assembly 12 may be formed of glass or a plastic material, such as polystyrene, acrylic or the like, containing the optical fibers 12. The screen assembly 10 may be dimensioned to fit any desired image reproduction system e.g. rectangular shape for viewing motion pictures in a motion picture theater, or in the home, for viewing slides, etc., it being understood that the screen assembly 10 of the embodiment of FIGS. 1 and 2 is for rear view projection as will become apparent to one skilled in the art. The thickness of the screen assembly 10 generally ranges from 0.5 mm to 16 inches, with preferable thickness being determined by end usage and processing requirements, as more fully hereinafter discussed.

The optical fibers 12 are generally of the monomode light guide type comprised of a core surrounded by a cladding of a lower refractive index material. Typically, cores of such monomode light guides are of a diameter of from 100 $\mu$m to 0.5 inches with a cladding of from 0.2 mm to 0.20 mm. The optical fibers 12 are bounded within the frame member 16 preferably in dense packed relationship, i.e. parallel lines and alternating rows of the optical fibers 14 off-set from one another by one-half diameter of the optical fiber, as illustrated in the blown up portion of FIG. 1. After bundling of the optical fiber 12 within the frame 16, each surface portion 18 is heat treated, such as by contact with a teflon iron, to fuse such surface portion 18. Thereafter, each such surface portion 18 is subjected to a polishing step, such as polishing or sand blasting with particles of a size of from 220 grit to 800 grit using a polishing apparatus available from Once polishing of both surface portions 18 of the screen assembly 10 has been completed, the screen assembly 10 is ready for in rear view imaging projection. Since the transmission of actinic radiation through the optical fibers 12 involves essentially no energy loss (low percentage of ambient losses in transmission), an image viewed through and from the side of the screen assembly 10 opposite projection to the screen assembly 10 of the present invention illustrated in FIGS. 1 and 2 will be of greater resolution and chromatic reproduction than the screen assemblies of the prior art for rear projections. Additionally, a screen assembly 10 of the present invention may take any dimensional shape and may be sized to dimensions of from 40 mm to 50 feet and larger.

Figure 3:
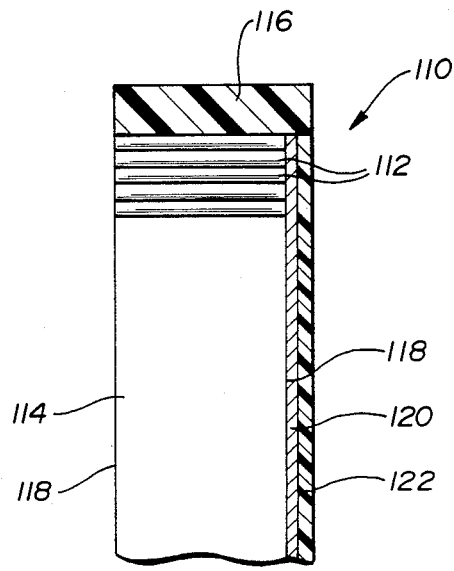
FIG. 3 is an enlarged cross-sectional view of another embodiment of the screen assembly of the present invention.

The screen assembly, generally indicated as 110, referring now to FIG. 3 is a front viewing screen assembly as will become apparent to one skilled in the art. The screen assembly 110 of FIG. 3 is similarly comprised of monomode optical light guides 112 forming a screen member 114 disposed in a frame 116 and is similarly formed through the polishing steps of the screen assembly 10 of the embodiments of FIGS. 1 and 2. After polishing of both surface portions 118, on one surface portion 118, there is formed a layer 120 of a light reflecting material, such as magnesium fluoride, rhodium or the like. Generally, such light reflecting layer 120 is of a thickness of at least about 1.0 mm and preferably in the range of from 1 to 5 mm. Such a reflective layer 120 may be formed by vapor deposition techniques, as known to one skilled in the art. After formation of the light reflective layer 120, there is formed a protective layer 122 of an appropriate thermoplastic material, e.g. acrylic resins or the like, which may or may not be polished.

Numerous modifications and variations of the present invention are possible in light of the above teachings and, therefore, within the scope of the appended claims, the invention may be practised otherwise than as particularly described.

What is claimed is:

1. A novel screen assembly comprised of:
   a frame member; and
   a plurality of optical fibers parallelly-disposed within said frame member and in closed packed relationship and bonded to each other, said optical fibers being of a length of from 0.5 mm to 16 inches thereby forming front and rear surface portions of said frame member, said front surface portion being formed in parallelled relationship to said rear surface portions, said front and rear surface portions having polished surfaces, said screen assembly receiving and projecting light images.

2. The novel screen assembly as defined in claim 1 wherein said optical fibers are of a diameter of from 100 $\mu$m to 0.5 inches.

3. The novel screen assembly as defined in claim 2 wherein said optical fibers are formed with a thickness of cladding of from 0.20 $\mu$m to 0.20 mm.

4. The novel screen assembly as defined in claim 1 wherein a reflective layer is formed over a rear portion thereof.

5. The novel screen assembly as defined in claim 4 wherein said reflective layer is formed of magnesium flouride.

6. The novel screen assembly as defined in claim 4 wherein said reflective layer is formed of rhodium.

7. The novel screen assembly as defined in claim 4 wherein said reflective layer is overlaid with a protective layer.

8. A method of forming a novel screen assembly, which comprises:
   (a) forming a plurality of optical fibers in closed packed relationship and bonded to one another into a screen member of a thickness of from 0.5 mm to 16 inches including front and rear surface portions, said front surface portion being formed in parallelled relationship to said rear surface portions; and
   (b) polishing said front and rear surface portions, said screen assembly receiving and projecting light images.

9. The method as defined in claim 8 and additionally comprising the step of fusing said front and rear surface portions prior to step (b).

10. The method as defined in claim 9 wherein said optical fibers are of a diameter of from 100 $\mu$m to 0.5 inches with a thickness of cladding of from 0.20 $\mu$m to 0.20 mm.

11. The method as defined in claim 9 wherein one of said portions is coated with a light reflective material.

12. The method as defined in claim 9 wherein said light reflective material is overcoated with a protective layer.

* * * * *